United States Patent
Hamasaki

(10) Patent No.: US 9,405,386 B2
(45) Date of Patent: Aug. 2, 2016

(54) INFORMATION PROCESSING APPARATUS, INFORMATION PROCESSING METHOD, AND INFORMATION PROCESSING SYSTEM

(71) Applicant: FUNAI ELECTRIC CO., LTD., Osaka (JP)

(72) Inventor: Tadashi Hamasaki, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 226 days.

(21) Appl. No.: 14/309,027

(22) Filed: Jun. 19, 2014

(65) Prior Publication Data

US 2015/0009137 A1    Jan. 8, 2015

(30) Foreign Application Priority Data

Jul. 2, 2013  (JP) ................................. 2013-139288

(51) Int. Cl.
  *G06F 3/033* (2013.01)
  *G06F 3/038* (2013.01)
  *G06F 3/0346* (2013.01)

(52) U.S. Cl.
  CPC .............. *G06F 3/038* (2013.01); *G06F 3/0346* (2013.01)

(58) Field of Classification Search
  CPC ..... G06F 3/038; G06F 3/0346; G06F 3/0383; G06F 3/03542; G06F 3/03543; G06F 3/03545; G06F 3/0386
  See application file for complete search history.

(56) References Cited

U.S. PATENT DOCUMENTS

| | | | | | |
|---|---|---|---|---|---|
| 5,508,717 | A | * | 4/1996 | Miller | G06F 3/038 345/157 |
| 5,940,078 | A | * | 8/1999 | Nagarajayya | G06F 3/04817 715/835 |
| 6,362,840 | B1 | * | 3/2002 | Burg | G06F 3/0481 715/708 |
| 2009/0066647 | A1 | * | 3/2009 | Kerr | G06F 3/0346 345/158 |
| 2010/0295778 | A1 | * | 11/2010 | Abe | G06F 3/0481 345/157 |

FOREIGN PATENT DOCUMENTS

| | | |
|---|---|---|
| JP | 10-133822 | 5/1998 |
| JP | 10-240445 | 9/1998 |
| JP | 2001-5606 | 1/2001 |
| JP | 2005-12433 | 1/2005 |

* cited by examiner

*Primary Examiner* — Rodney Amadiz
(74) *Attorney, Agent, or Firm* — Wenderoth, Lind & Ponack, L.L.P.

(57) ABSTRACT

An information processing apparatus includes: an operating information obtaining unit which receives, from a remote control, button-press information indicating that an enter button has been pressed; a display control unit which displays, on a display screen, one or more objects each associated with an executable function, and a pointer at a position designated by the remote control; and an executing unit which executes a function associated with a first object out of the objects when the operating information obtaining unit receives the button-press information during a period that starts when a predetermined first period lapses from a first time point at which the pointer enters a region of the first object, and ends when a predetermined second period lapses from a second time point at which the pointer deviates from the region.

13 Claims, 24 Drawing Sheets

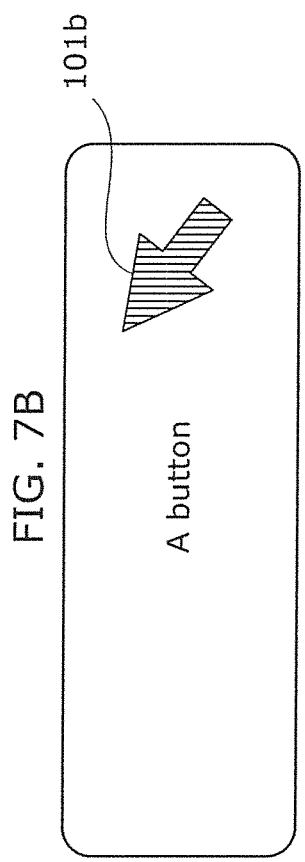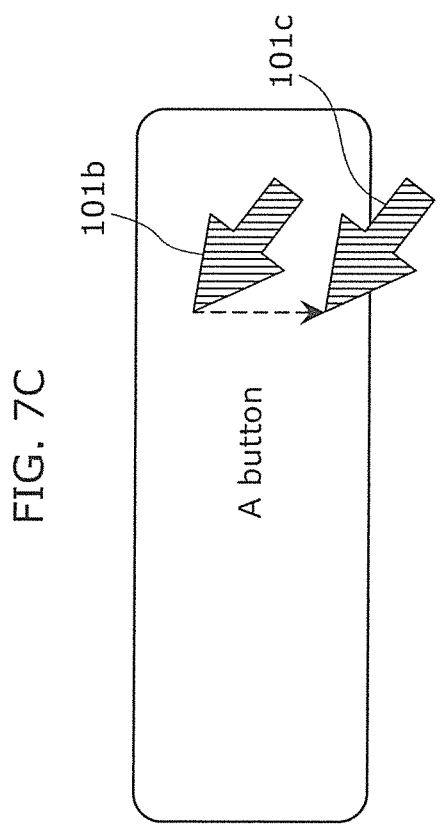

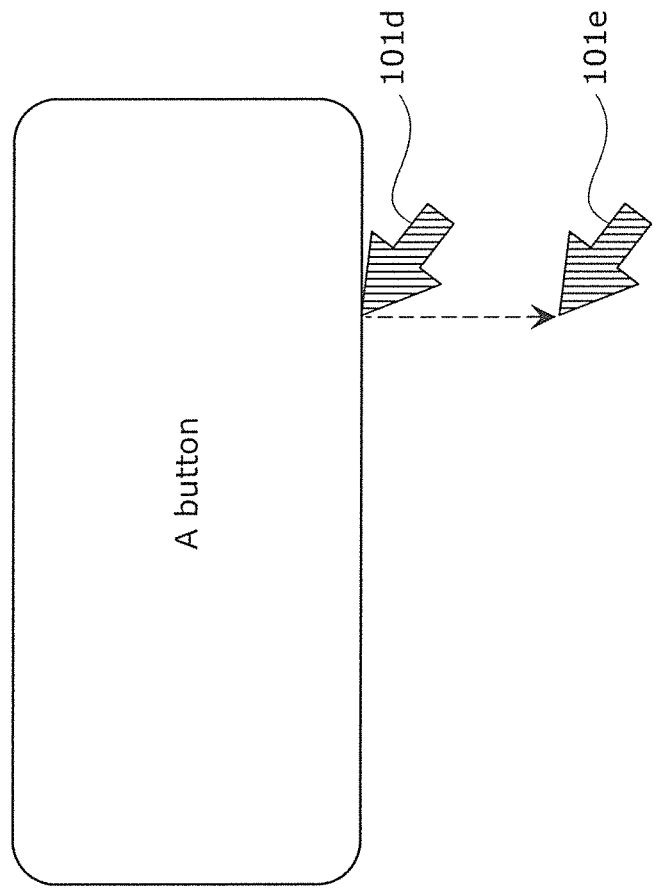

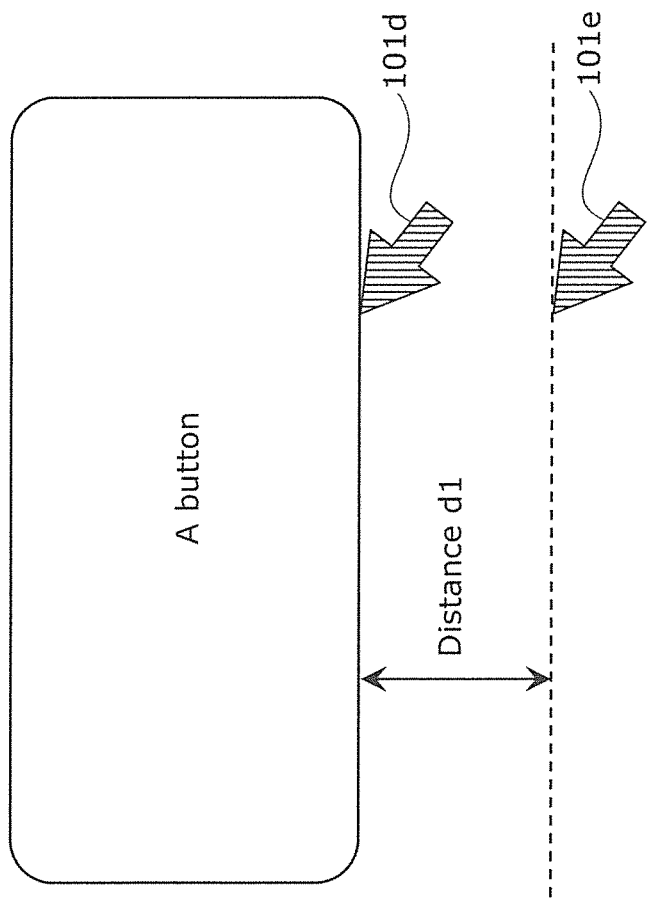

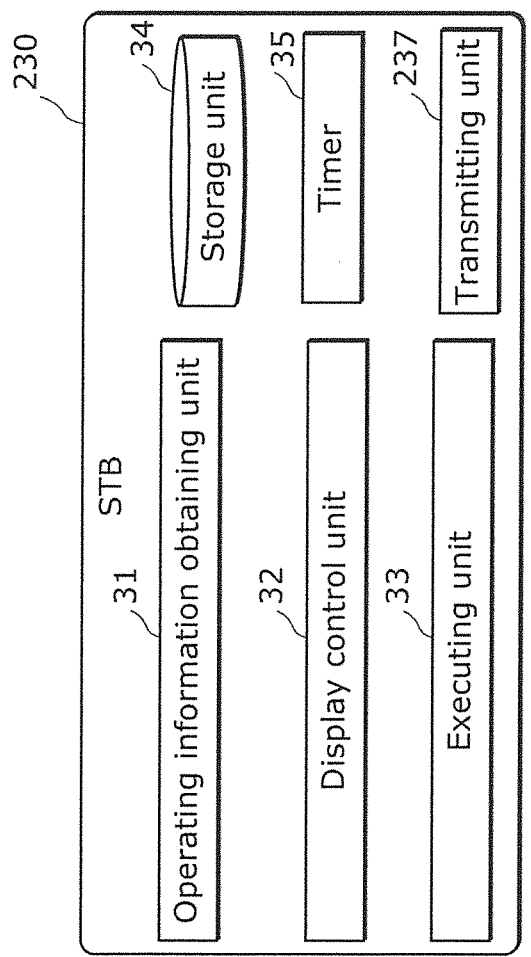

INFORMATION PROCESSING APPARATUS, INFORMATION PROCESSING METHOD, AND INFORMATION PROCESSING SYSTEM

CROSS REFERENCE TO RELATED APPLICATION

The present application is based on and claims priority of Japanese Patent Application No. 2013-139288 filed on Jul. 2, 2013. The entire disclosure of the above-identified application, including the specification, drawings and claims is incorporated herein by reference in its entirety.

FIELD

The present invention relates to information processing apparatuses, information processing methods, and information processing systems.

BACKGROUND

Recent years have seen development in gyro remote controls equipped with gyro sensors. For example, Patent Literature (PTL) 1 discloses a technique which allows a user to remotely control the display screen of a television (TV) by using a gyro remote control. With this technique, for example, a user can move the position of a pointer (may also be referred to as a mouse pointer or MP) displayed on the display screen, by holding the gyro remote control in the user's hand and spatially moving the control. The user moves the pointer to the region of an object, such as an icon, displayed on the display screen, and presses the enter button on the gyro remoter control, so as to execute a function given to the object. In such a manner, the user can intuitively perform remote control by using the gyro remoter control.

CITATION LIST

Patent Literature

[PTL 1] Japanese Unexamined Patent Application No. 2005-12433
[PTL 2] Japanese Unexamined Patent Application No. 10-240445

SUMMARY

Technical Problem

When the user presses the enter button of the gyro remoter control, however, the user may fail to maintain the position of the pointer within the region of the object on the display screen, due to, for example, shaking of hand (hereinafter, referred to as "hand shake"). This may cause the position of the pointer to deviate from the region. In other words, position deviation of the pointer caused by hand shake may cause such an erroneous operation that an intended function cannot be executed.

Moreover, displays, such as TV, in recent years have enhanced resolution, and thus, a large number of objects may be displayed on the display screen. In such a case, the distance between adjacent objects is small. The distance further decreases when the size of the display decreases. In other words, the erroneous operation is more likely to occur due to the position deviation of the pointer caused by hand shake.

For example, PTL 2 discloses a technique of correcting the position of the pointer deviated from the region of an object to a position within the region. However, such a correction causes discontinuous movement of the positions of the pointer, which adversely results in loss of the user's intuitive operational feeling. In addition, when the distance between adjacent objects is small, an erroneous operation is caused.

The present invention has been conceived in view of the above, and has an object to provide an information processing apparatus, an information processing method, and an information processing system which allow reduction in erroneous operations caused due to hand shake.

Solution to Problem

In order to achieve the above object, an information processing apparatus according to one aspect of the present invention is an information processing apparatus which receives an operation performed on a display screen by a pointing device including an enter button. The information processing apparatus includes: an operating information obtaining unit which receives, from the pointing device, button-press information indicating that the enter button has been pressed; a display control unit which displays one or more objects and a pointer on the display screen, the one or more objects each being associated with an executable function, the pointer being displayed at a position designated by the pointing device; and an executing unit which executes a function associated with a first object out of the one or more objects when the operating information obtaining unit receives the button-press information during a period (i) starting when a predetermined first period elapses from a first time point at which the pointer enters a region of the first object and (ii) ending when a predetermined second period elapses from a second time point at which the pointer deviates from the region of the first object.

The above configuration is less likely to cause a wasteful action (miss of the press of the enter button) performed when a user moves the pointer to the region of the first object and press the enter button. The wasteful action is, for example, that the pointer deviates from the region of the first object due to hand shake, and the function associated with the first object is not executed. In addition, the above configuration reduces such another wasteful action in that the pointer deviates from the region of the first object due to hand shake and enters the region of the second object that is different from the first object, resulting in execution of the function associated with the second object.

As described above, the above configuration allows effective operations (actions) without being influenced by hand shake and the like. As a result, it is possible to provide an information processing apparatus which allows reduction in erroneous operations caused due to hand shake.

Moreover, beginner users and the like tend to avoid use of pointing devices because it takes time for them to get used to the devices. The above configuration, however, allows reduction in erroneous operations caused due to hand shake. Hence, it takes less time for the beginner users to get used to the pointing devices.

Furthermore, for example, it may be that the executing unit further executes the function associated with the first object when the operating information obtaining unit receives the button-press information during the period and the pointer is within a predetermined distance from a boundary of the region of the first object.

With the configuration, in view of safety, only when the position of the pointer after the deviation caused by hand shake is within a given range from the first object, the function associated with the first object can be executed.

Here, for example, it may be that the pointing device further includes an angular velocity detecting unit which detects angular velocity, the operating information obtaining unit receives, from the pointing device, the button-press information and angular velocity information indicating the angular velocity, and the display control unit displays the one or more objects and the pointer on the display screen, the pointer being displayed at a position determined according to the angular velocity information as the position designated by the pointing device.

Furthermore, for example, it may be that the information processing apparatus further includes: a holding unit which holds the first time point and the second time point; and a timer which counts the predetermined first period from the first time point, and the predetermined second period from the second time point.

Furthermore, it may be that the executing unit includes: a position obtaining unit which obtains a position of a region including each of the one or more objects on the display screen and a position of the pointer on the display screen; and a function activating unit which activates the function associated with the first object when the predetermined first period elapses from the first time point.

For example, it may be that the function activating unit further presents that the function associated with the first object has been activated, by causing the display control unit to change a color of the pointer when the predetermined first period elapses from the first time point.

With the above configurations, it is possible to visually inform the user by a change in color of the pointer that the function associated with the first object has been activated.

For example, it may be that the function activating unit causes the display control unit to change the color of the pointer over time during the predetermined first period from the first time point.

For example, it may be that the function activating unit further presents that the function associated with the first object has been activated, by causing the display control unit to change a color of the first object when the predetermined first period elapses from the first time point.

With the above configurations, it is possible to visually inform the user by a change in color of the pointer that the function associated with the first object has been associated.

For example, it may be that the function activating unit causes the display control unit to change the color of the first object over time during the predetermined first period from the first time point.

Moreover, it may be that at least one of (i) the pointing device, (ii) the information processing apparatus, and (iii) a display apparatus including the display screen includes a speaker, and the function activating unit further presents that the function associated with the first object has been activated, by causing the speaker to output sound when the predetermined first period elapses from the first time point.

With the above configurations, it is possible to inform the user by sound that the function associated with the first object has been activated.

For example, it may be that the pointing device further includes a vibrating function unit which causes vibration, and the function activating unit further presents that the function associated with the first object has been activated, by causing the vibrating function unit to cause vibration when the predetermined first period elapses from the first time point.

With the above configuration, it is possible to inform the user that the function associated with the first object has been activated, through vibration of the pointing device held in the user's hand.

Moreover, in order to achieve the above object, a system according to an aspect of the present invention includes: a pointing device including an enter button; and an information processing apparatus which receives an operation performed on a display screen by the pointing device. The information processing apparatus includes: an operating information obtaining unit which receives, from the pointing device, button-press information indicating that the enter button has been pressed; a display control unit which displays one or more objects and a pointer on the display screen, the one or more objects each being associated with an executable function, the pointer being displayed at a position designated by the pointing device; and an executing unit which executes a function associated with a first object out of the one or more objects when the operating information obtaining unit receives the button-press information during a period (i) starting when a predetermined first period elapses from a first time point at which the pointer enters a region of the first object and (ii) ending when a predetermined second period elapses from a second time point at which the pointer deviates from the region of the first object.

It should be noted that the present invention can be realized not only as an information processing apparatus including the above-mentioned characteristic processing units but also as an information processing method including, as steps, processes executed by the characteristic processing units included in the information processing apparatus. Also, the present invention can be realized as a program for causing a computer to function as the characteristic processing units included in the information processing apparatus or as a program for causing a computer to execute the characteristic steps included in the information processing method. It is needless to say that such a program can be distributed via a non-transitory computer readable recording medium such as a CD-ROM (Compact Disc-Read Only Memory) and a communication network such as the Internet.

Advantageous Effects

According to the present invention, it is possible to provide an information processing apparatus, an information processing method, and an information processing system which allow reduction in erroneous information input caused by hand shake.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 7B illustrates another example of the region of the object and the position of the pointer.

FIG. 7C illustrates another example of the region of the object and the positions of the pointer.

FIG. 7D illustrates another example of the region of the object and the positions of the pointer.

FIG. 8 illustrates an example of the region of the object and the positions of the pointer.

FIG. 22 is a block diagram illustrating an example of a configuration of an STB according to Embodiment 4.

DESCRIPTION OF EMBODIMENTS

The following is a detailed description of embodiments of the present invention, with reference to accompanying drawings. It should be noted that the Drawings do not necessarily depict the exact dimension or dimension ratio.

Each of the embodiments described below will illustrate one specific example of the present invention. The numerical values, shapes, materials, structural components, the arrangement and connection of the structural components mentioned in the following embodiments are merely exemplary and not intended to limit the present invention. The present invention is defined by the scope of Claims. Thus, among the structural components in the following embodiments, structural components not recited in any one of the independent claims are not necessarily required to achieve the objects of the present invention, but will be described as structural components for preferable embodiments.

Embodiment 1

Referring to FIG. 1 to FIG. 12, a description is given of an information processing apparatus, an information processing method, and an information processing system according to Embodiment 1.

Figure 1:
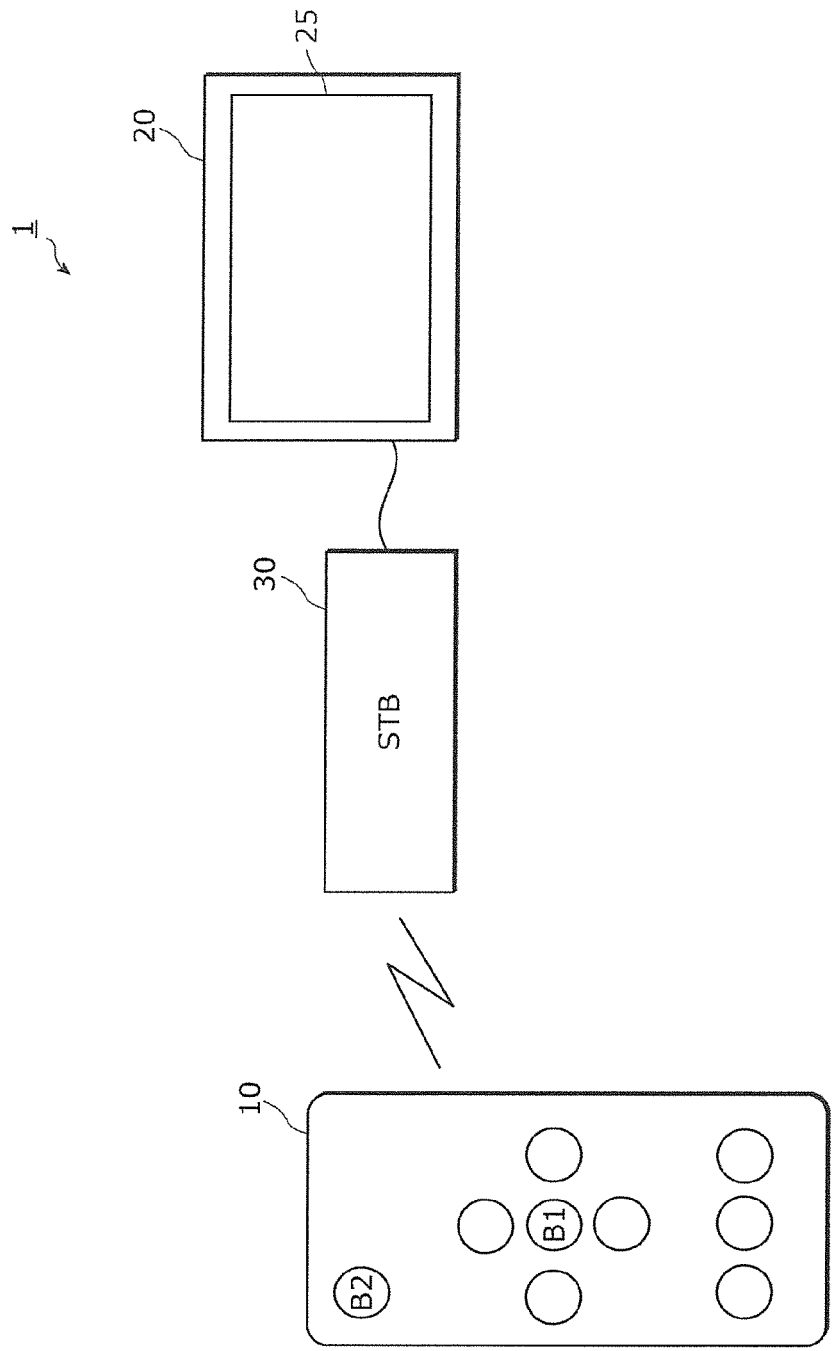
FIG. 1 illustrates an example of an information processing system 1.

FIG. 1 illustrates an example of an information processing system 1.

The information processing system 1 illustrated in FIG. 1 includes a remote control 10, a liquid crystal display 20 including a display screen 25, and a set top box (STB) 30 that is an example of an information processing apparatus.

[1-1. Configuration of Remote Control 10]

Figure 2:
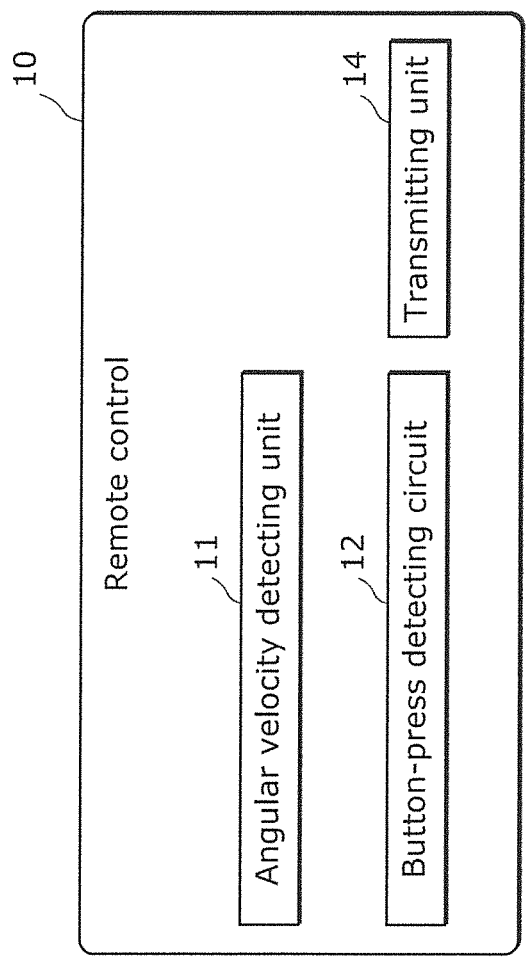
FIG. 2 is a block diagram illustrating an example of an internal configuration of a remote control according to Embodiment 1.

FIG. 2 is a block diagram illustrating an example of an internal configuration of the remote control 10.

The remote control 10 is an example of a pointing device that includes an enter button, and is a remote control for operating the STB 30. A pointer is displayed on the display screen 25 at a position designated by the remote control 10.

As FIG. 1 and FIG. 2 illustrate, the remote control 10 includes: a plurality of buttons including at least an enter button B1; an angular velocity detecting unit 11; a button-press detecting circuit 12; and a transmitting unit 14.

The buttons are provided on the surface of the case of the remote control 10. In Embodiment 1, as FIG. 1 illustrates, the remote control 10 includes nine buttons. For example, the button B1 is an enter button, and a button B2 is a power button.

The power button B2 is for switching between power-on and power-off of the STB 30.

The enter button B1 is a button that is pressed when a user wants to execute a function associated with an object on the display screen 25 of the liquid crystal display 20. The enter button B1 is pressed, for example, when the user moves a pointer to the region of a first object on the display screen 25 of the liquid crystal display 20 by using the remote control 10 to execute a function associated with the first object.

The enter button B1 is configured such that the user can operate the enter button B1 while looking at only the display screen of the liquid crystal display 20 without looking at the remote control. For example, it may be that the amount of depression of the enter button B1 may be different from that of the other buttons, or that only the enter button B1 includes a raised portion.

The angular velocity detecting unit 11 is a sensor for detecting angular velocity. More specifically, the angular velocity detecting unit 11 detects, as angular velocity, acceleration along the X-axis (see FIG. 1) that is horizontal to the display screen of the liquid crystal display 20 and acceleration along the y-axis (see FIG. 1). In FIG. 1, the horizontal direction of the display screen is the x-axis direction, and the vertical direction of the display screen is the y-axis direction. Moreover, the angular velocity detecting unit 11 transmits, to the STB 30 via the transmitting unit 14, angular velocity information indicating the detected angular velocity.

The button-press detecting circuit 12 detects, for example, that the enter button B1 has been pressed. The button-press detecting circuit 12 transmits, to the STB 30 via the transmitting unit 14, button-press information indicating that the enter button B1 has been pressed.

The transmitting unit 14 is an interface for wireless communication with the STB 30, and transmits the angular velocity information, the button-press information, and the like. Examples of the wireless communication include Bluetooth (registered trademark), RF4CE, and Wi-Fi (registered trademark). When the wireless communication is Bluetooth (registered trademark) or Wi-Fi (registered trademark), the transmitting unit 14 transmits the angular velocity information, the button-press information, and the like by establishing bidirectional transmission with the STB 30.

[1-2. Configuration of Liquid Crystal Display 20]

The liquid crystal display 20 is an example of a display apparatus, and displays, on the display screen 25, a menu screen, a button screen, a check box screen, and the like in response to a signal from the STB 30 that is to be described later.

[1-3. Configuration of STB 30]

Figure 3:
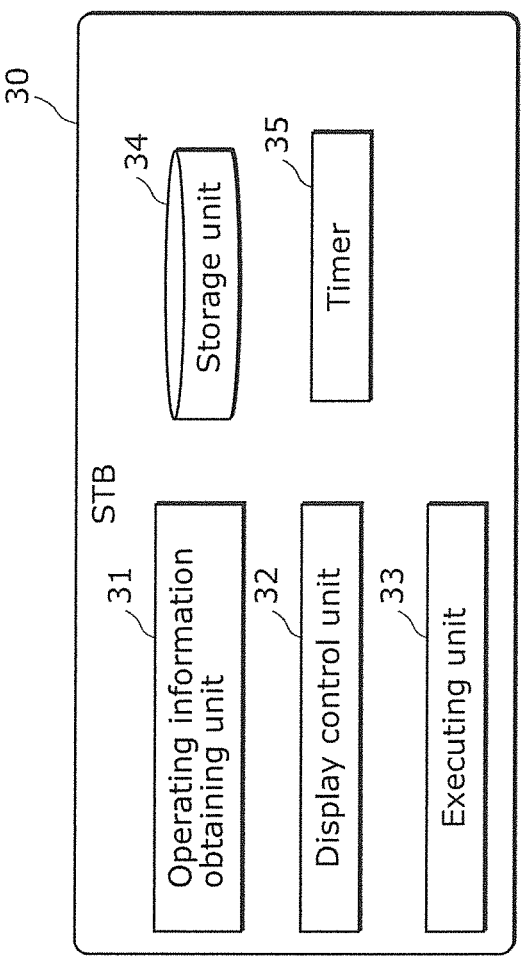
FIG. 3 is a block diagram illustrating an example of a configuration of an STB according to Embodiment 1.
Figure 4:
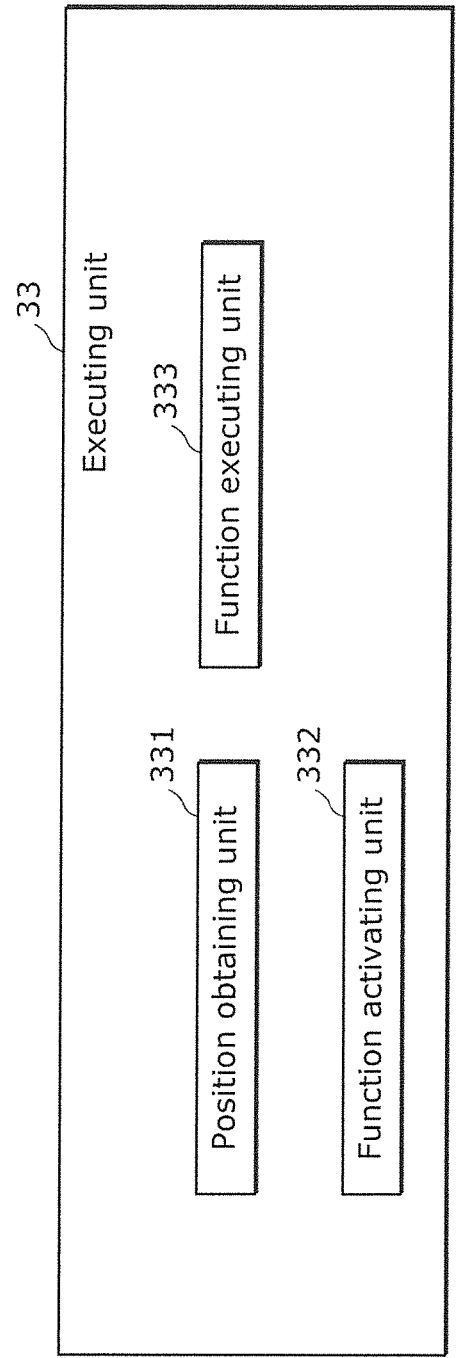
FIG. 4 is a block diagram illustrating an example of a detailed configuration of an executing unit in the STB according to Embodiment 1.
Figure 5:
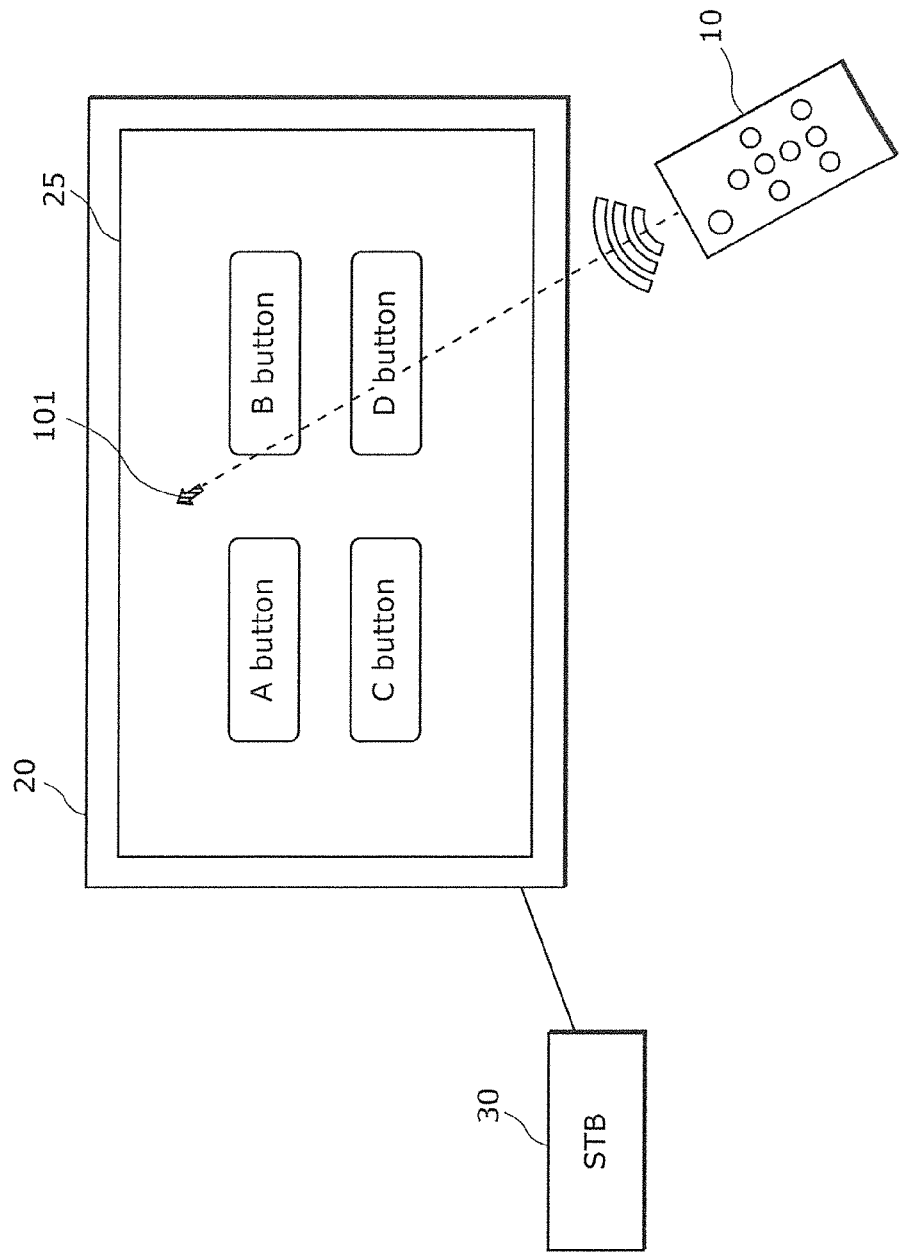
FIG. 5 illustrates an example of a display screen according to Embodiment 1.

FIG. 3 is a block diagram illustrating an example of a configuration of the STB 30. FIG. 4 is a block diagram illustrating an example of a detailed configuration of an executing unit in the STB 30. FIG. 5 illustrates an example of the display screen 25.

The STB 30 is an example of an information processing apparatus. The STB 30 receives an operation performed on the display screen 25 by a pointing device (the remote control 10 in FIG. 3) that includes the enter button B1 and that is held in a user's hand.

More specifically, for example, the STB 30 is an apparatus that can use ANDROID (registered trademark). As FIG. 3 illustrates, the STB 30 includes an operating information obtaining unit 31, a display control unit 32, an executing unit 33, a storage unit 34, and a timer 35. In Embodiment 1, the operating information obtaining unit 31, the display control unit 32, the executing unit 33, and the timer 35 are achieved, for example, by a central processing unit (CPU) executing a computer program (software) that executes the information processing method according to Embodiment 1.

The operating information obtaining unit 31 receives, from the remote control 10 including the enter button B1, button-press information indicating that the enter button B1 has been pressed. In Embodiment 1, the operating information obtaining unit 31 receives, from the remote control 10, angular velocity information indicating angular velocity and the button-press information. For example, the operating information obtaining unit 31 receives, from the remote control 10, the angular velocity information and the button-press information via wireless communication.

The display control unit 32 displays, on the display screen 25, one or more objects each of which is associated with an executable function. The display control unit 32 also displays, on the display screen 25, a pointer at the position designated by the remote control 10. The display control unit 32 appropriately sets the display position of the pointer, for example, the x-y coordinates, according to the angular velocity information received by the operating information obtaining unit 31. For example, when the angular velocity information includes acceleration along the x-axis, the pointer is moved in the x-axis direction by a distance according to the acceleration. When the angular velocity information includes acceleration along the y-axis, the pointer is moved in the y-axis direction by a distance according to the acceleration. In other words, the user can move the position of the pointer 101 by changing the angle of the remote control 10 relative to the display screen.

In Embodiment 1, the display control unit 32 displays one or more objects on the display screen 25, and also displays, on the display screen 25, a pointer at the position determined according to the angular velocity as the position designated by the remote control 10. More specifically, for example, as FIG. 5 illustrates, the display control unit 32 displays, on the display screen 25, A button to D button that are examples of the one ore more objects. The display control unit 32 displays A button to D button, and also displays the pointer 101 at the position according to the angular velocity information transmitted by the remote control 10 as the position designated by the remote control 10.

The executing unit 33 includes, as FIG. 4 illustrates, a position obtaining unit 331, a function activating unit 332, and a function executing unit 333. Hereinafter, referring to FIG. 6 to FIG. 8, a description is given of functions of the executing unit 33.

Figure 6:
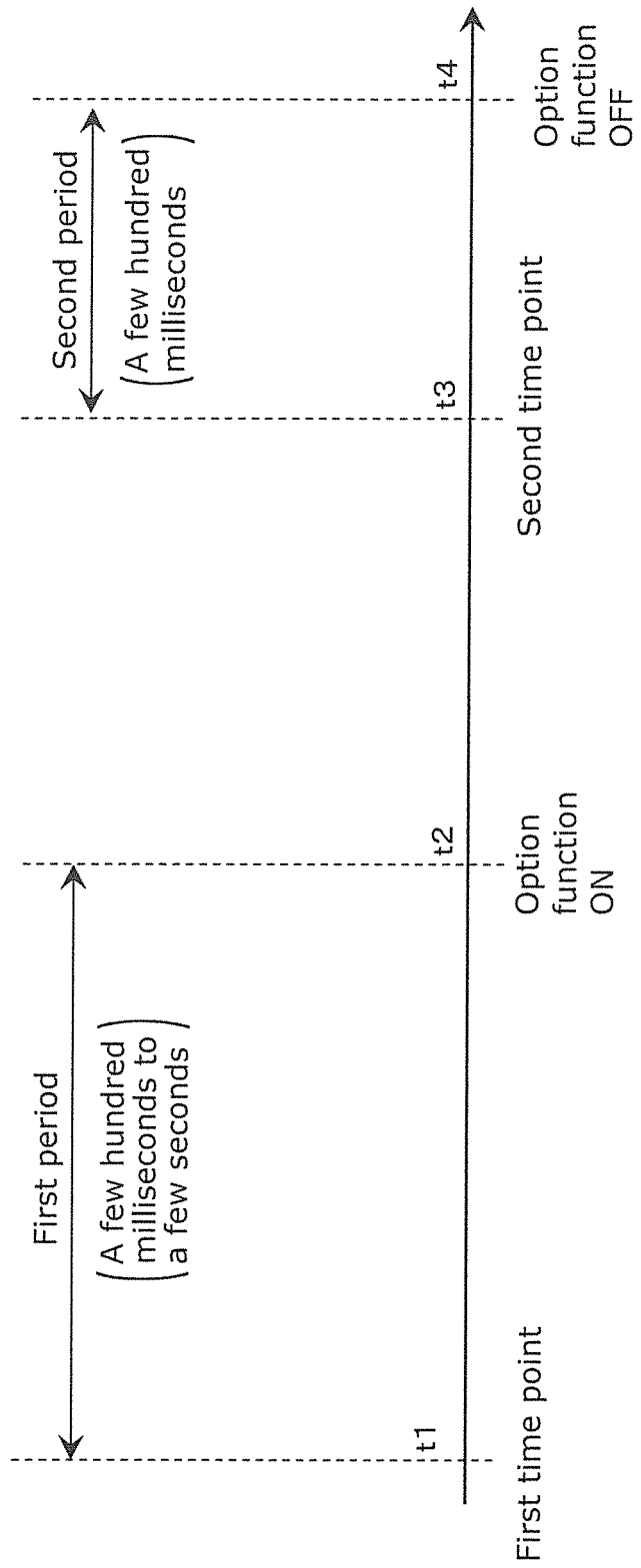
FIG. 6 is a drawing for illustrating functions of the executing unit according to Embodiment 1.

FIG. 6 is a diagram for illustrating functions of the executing unit 33 in the STB 30. FIG. 7A to FIG. 7D and FIG. 8 illustrate examples of the region of an object and the positions of the pointer.

The function executing unit 333 executes a function associated with a first object out of the objects displayed on the display screen 25, when the operating information obtaining unit 31 receives button-press information during a period described below. Specifically, the period starts at a time point (t2) that is when a predetermined first period elapses from a first time point (t1), and ends at a time point (t4) that is when a predetermined second period elapses from a second time point (t3). The first time point (t1) is when the pointer 101 enters the region of the first object. The second time point (t3) is when the pointer 101 deviates from the region of the first object.

Here, for example, the first object is the A button illustrated in FIG. 7A to FIG. 7D and FIG. 8. In this case, the first time point (t1) in FIG. 6 is, for example, when the pointer 101a enters the region of the A button in FIG. 7A. The second time point (t3) in FIG. 6 is, for example, when the pointer 101d deviates from the region of the A button in FIG. 7D.

The position obtaining unit 331 obtains the positions of the regions of the objects on the display screen 25 and the position of the pointer 101 on the display screen 25. For example, in the examples illustrated in FIG. 7A to FIG. 7D and FIG. 8, the position obtaining unit 331 obtains the position of the A button that is an object and the positions of the pointers 101a to 101e on the display screen 25.

As FIG. 6 illustrates, for example, the function activating unit 332 activates (enables) a function associated with the first object (option function) at the time point (t2) that is when a first period elapses from the first time point (t1). Hereinafter, the activating may also be referred to as switching on an option function. Furthermore, the function activating unit 332 inactivates a function associated with the first object (option function) at the time point (t4) that is when a predetermined second period elapses from the second time point (t3). Hereinafter, the inactivating may also be referred to as switching off an option function. The first period is, for example, set to a few hundred milliseconds to a few seconds. The second period is, for example, set to a few hundred milliseconds.

Figure 7A:
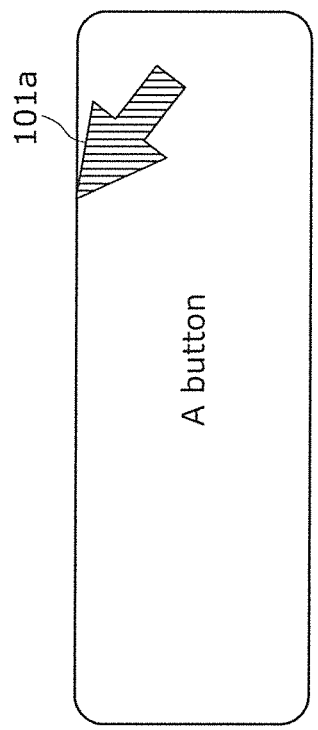
FIG. 7A illustrates an example of the region of an object and the position of a pointer.

Here, when the first object is, for example, the A button illustrated in FIG. 7A to FIG. 7D and FIG. 8, the function activating unit 332 maintains the on-state of the option function (the function has been activated) while the pointer 101b stays within the region of the A button as FIG. 7B illustrates. Even if the pointer 101b is moved to the position of the pointer 101c by hand shake or the like as illustrated in FIG. 7C, the function activating unit 332 maintains the on-state of the option function as long as the pointer 101c stays within the region of the A button. Moreover, as FIG. 7D illustrates, even if the pointer 101d deviates from the region of the A button due to hand shake or the like, and is moved to the position of the pointer 101e, the function activating unit 332 maintains the on-state of the option function for a predetermined period (second period) from the time point (the second time point; t3) at which the pointer 101 (pointer 101d) deviates from the region of the A button.

In this way, when the user moves the pointer 101 to the region of the button A and presses the enter button B1, it is possible to reduce such a wasteful action (miss of the press of the enter button B1) that the pointer 101 deviates from the region of the button A due to hand shake and a function associated with the button A is not executed.

It may be that the executing unit 33 executes the function associated with the first object when the operating information obtaining unit 31 receives button-press information during a period described below and when the pointer 101 is within a predetermined distance from the boundary of the region of the first object. The period starts at the time point (t2) that is when the first period elapses from the first time point (t1) and ends at the time point (t4) that is when the second period elapses from the second time point (t3). More specifically, as FIG. 8 illustrates, even within a predetermined period (second period) from the time point (second time point; t3) at which the pointer 101 (pointer 101*d*) deviates from the region of the A button that is an information object, and even if the option function is on (the function has been activated), it may be that the executing unit 33 does not execute the function if the position of the pointer 101*e* at the time of the press of the enter button B1 of the remote control 10 is not within a predetermined distance d1 from the boundary of the region of the button A. By checking whether the position (distance) of the pointer 101*e* after the deviation is within an appropriate range in the above manner, it is possible to consider safety, such as preventing a function associated with another object from being executed.

The storage unit 34 is an example of a holding unit, and holds the first time point (t1) and the second time point (t3). Here, the storage unit 34 is configured by using a given storage circuit, such as a random access memory (RAM) and a read only memory (ROM).

The timer 35 counts the predetermined first period from the first time point (t1) and counts the predetermined second period from the second time point (t3).

[1-4. Operation of STB 30]

Next, referring to FIG. 9 to FIG. 12, a description is given of an operation of the STB 30 configured as above.

Figure 9:
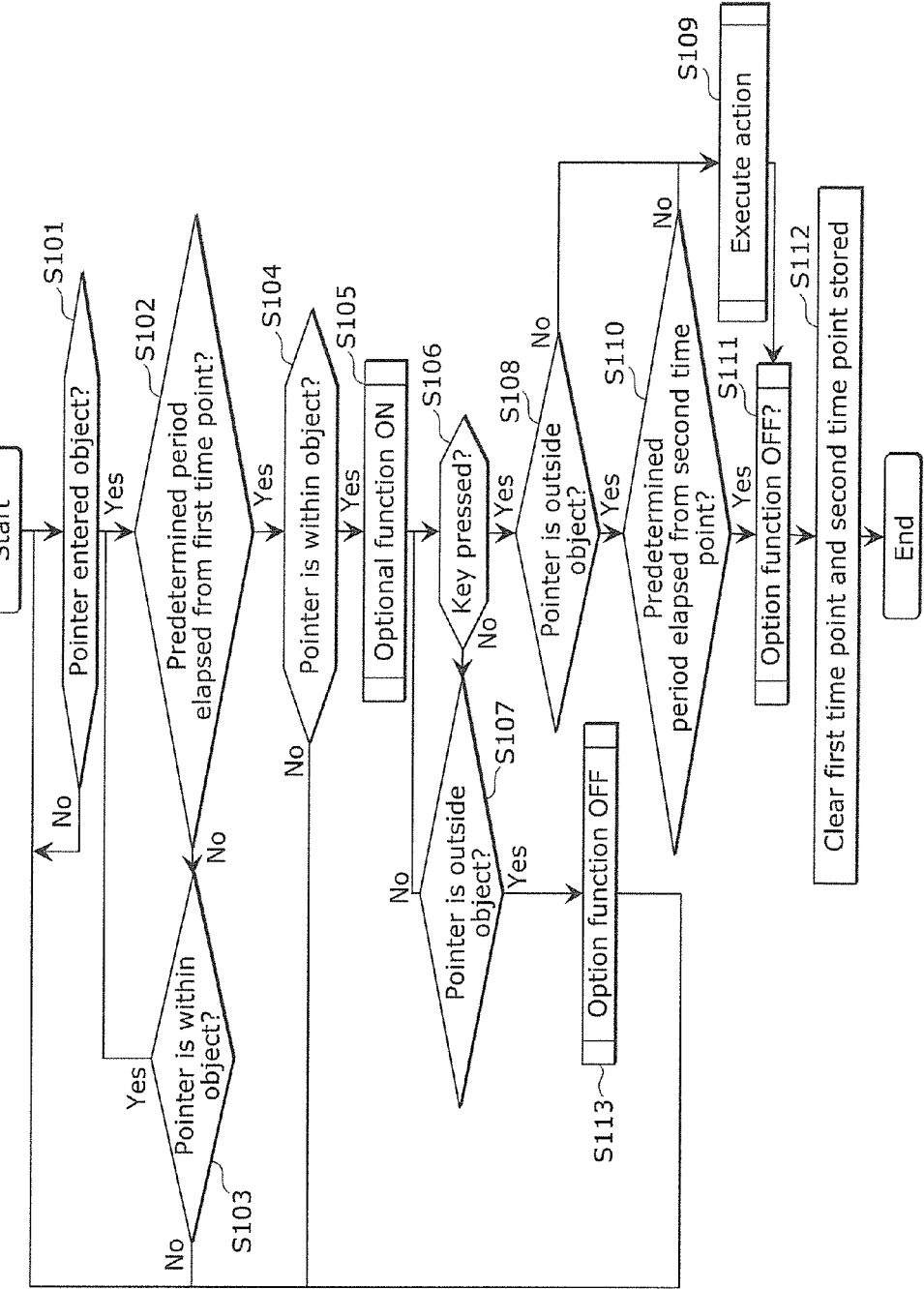
FIG. 9 is a flowchart of an example of procedure of an information processing method according to Embodiment 1.
Figure 10:
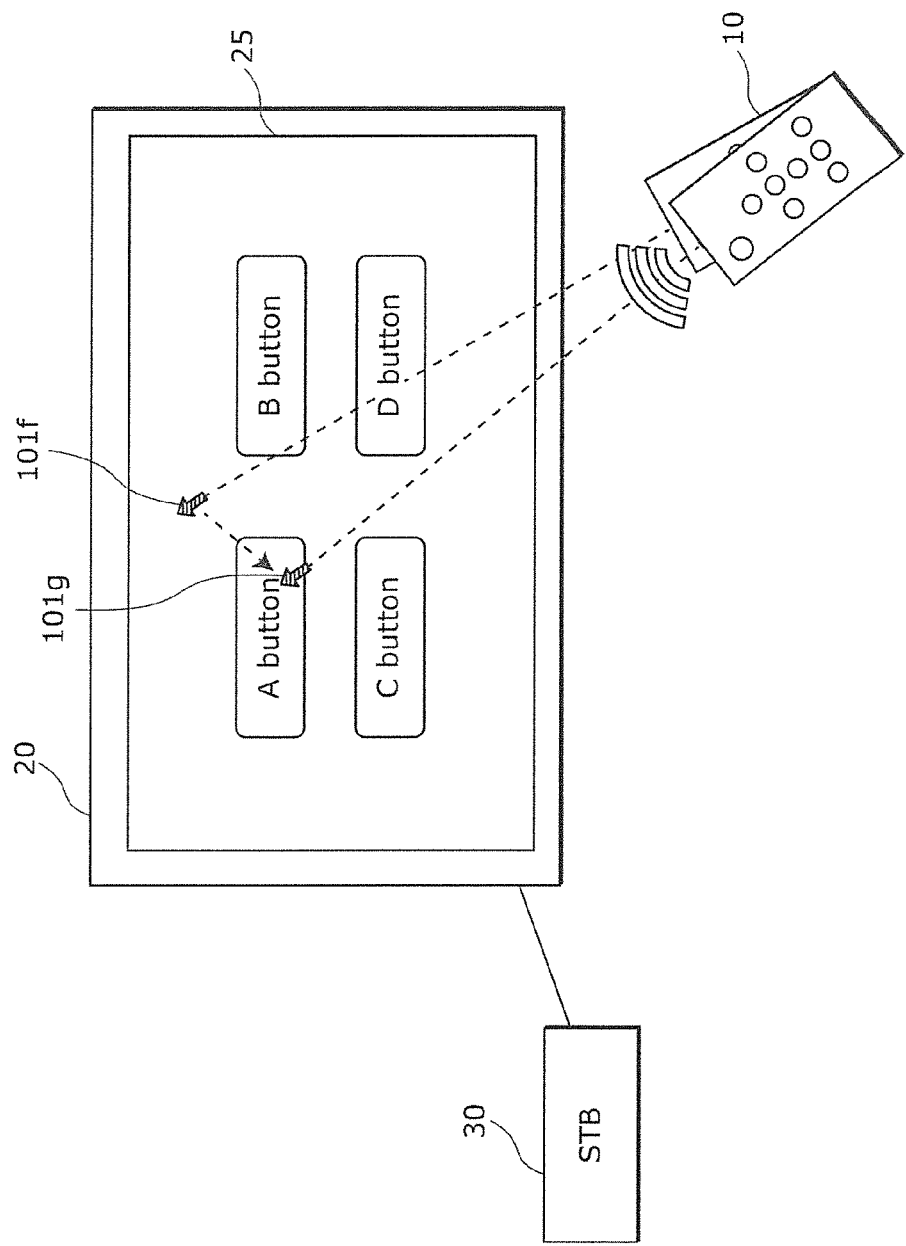
FIG. 10 illustrates an example of a display screen which displays objects and a pointer according to Embodiment 1.
Figure 11:
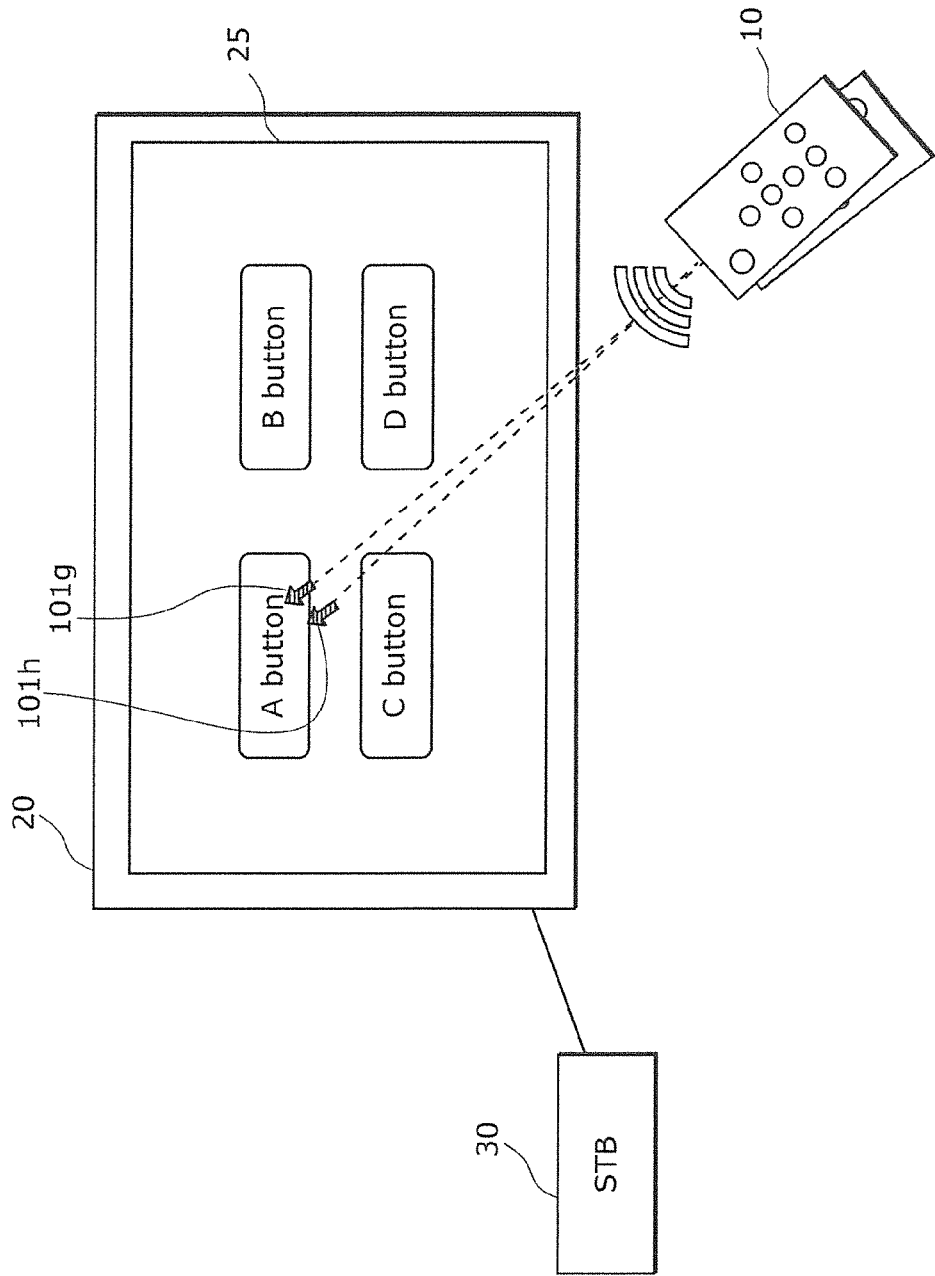
FIG. 11 illustrates another example of the display screen which displays objects and a pointer according to Embodiment 1.
Figure 12:
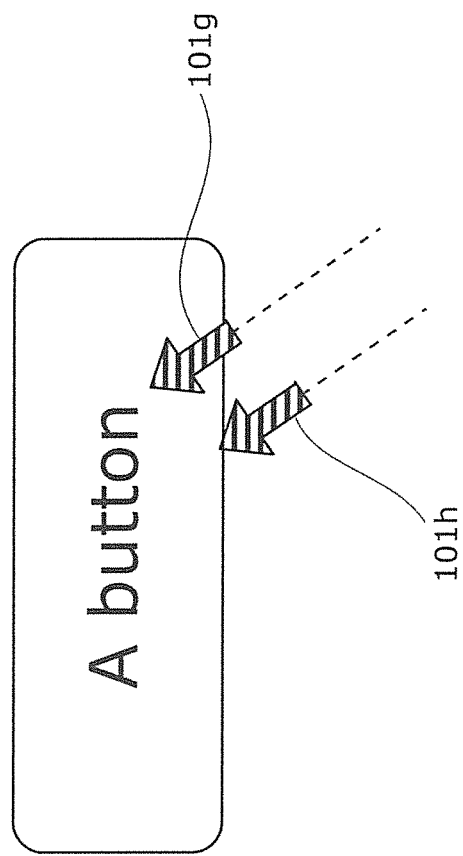
FIG. 12 illustrates an example of the region of an object and the positions of the pointer according to Embodiment 1.

FIG. 9 is a flowchart of an example of procedure of an information processing method executed by the STB 30. FIG. 10 and FIG. 11 illustrate examples of the display screen 25 that displays objects and pointers. FIG. 12 illustrates an example of the region of an object and the positions of the pointer. Here, the A button to the D button in FIG. 10 and FIG. 11 are objects displayed on the display screen 25.

First, the STB 30 determines whether or not the pointer has entered the region of an object (S101). In the example illustrated in FIG. 10, the function activating unit 332 determines whether or not the pointer has entered the region of an object, based on the positions of the regions of the A button to D button and the position of the pointer 101*f* obtained by the position obtaining unit 331.

Next, if there is an object associated with the function to be executed, the user moves the pointer to the region of the object by using the remote control 10. In the example in FIG. 10, the user moves the pointer to the region of the A button that is associated with the function to be executed, by changing the posture of the remote control 10.

When the STB 30 determines that the pointer has entered the region of the object (Yes in S101), the STB 30 determines whether or not a predetermined period (first period) has elapsed from the first time point (t1) at which the pointer enters the region of the object (S102). In the example shown in FIG. 10, when the STB 30 determines that the pointer 101*g* has entered the region of the A button, the STB 30 causes the storage unit 34 to temporarily store the first time point (t1) at which the pointer enters the region of the A button, and also causes the timer 35 to count time. In this way, the STB 30 can determine whether or not a predetermined period (first period) has elapsed from the first time point (t1).

When the STB 30 determines that a predetermined period (first period) has not elapsed from the first time point (t1) (No in S102), the STB 30 further determines whether or not the position of the pointer is within the region of the object (S103). When the pointer is within the region (Yes in S103), the processing returns to S102. When the pointer is outside the region (No in S103), the processing returns to S101.

On the other hand, when the STB 30 determines that a predetermined period (first period) has elapsed from the first time point (t1) (Yes in S102), the STB 30 further determines whether or not the pointer is within the region of the object (S104). When the pointer is within the region (Yes in S104), the option function is switched on, that is, the function associated with the object is activated (enabled) (S105). When the pointer is outside the region (No in S104), the processing returns to S101.

Next, the STB 30 determines whether or not the user has pressed the enter button of the remote control 10 (S106). In Embodiment 1, the executing unit 33 makes the above determination by determining whether or not the operating information obtaining unit 31 has received, from the remote control 10, button-press information indicating that the enter button B1 has been pressed.

When the enter button of the remote control 10 has not yet been pressed (No in S106), the STB 30 further determines whether or not the pointer is outside the region of the object (S107). When the pointer is outside the region (Yes in S107), the processing returns to S101. When the pointer is not outside the region (No in S107), the option function is switched off, that is, the function associated with the object is inactivated (disabled) (S113), and the processing returns to S106.

On the other hand, when the STB 30 determines that the enter button of the remote control 10 has been pressed (Yes in S106), the STB 30 further determines whether the pointer is outside the region of the object (S108). When the pointer is not outside the region (No in S108), an action is executed, that is, the function associated with the region of the object that includes the pointer is executed (S109). Subsequently, the processing proceeds to S111.

When the pointer is outside the region in S108 (Yes in S108), the STB 30 determines whether or not a predetermined period (second period) has elapsed from the second time point (t3) at which the pointer 101 deviates from the region of the object (S110). When it is determined that a predetermined period (second period) has not elapsed from the second time point (t3) (No in S110) an action is executed (S109).

Now, a description is given referring to FIG. 11 and FIG. 12. Even if the position of the pointer 101*g* within the region of the A button is moved to the position of the pointer 101*h* that is outside the region of the A button by hand shake of the user caused by the press of the enter button B1 of the remote control 10, it is determined that the movement of the positions of the pointer is caused by hand shake, for a predetermined period (second period) from the second time point (t3) at which the pointer deviates from the region of the A button. Then, the action is executed. The STB 30 can determine whether or not a predetermined period (second period) has elapsed from the second time point (t3) by causing the storage unit 34 to temporarily store the second time point (t3) at which the pointer deviates from the region of the A button, and also causing the timer 35 to count time.

Next, when the STB 30 determines in Step S110 that a predetermined period (second period) has elapsed from the second time point (t3) (Yes in S110), the STB 30 switches off the option function, that is, inactivates (disables) the function associated with the object (S111).

Subsequently, the STB 30 clears (discards) the first time point (t1) and the second time point (t3) stored in the storage unit 34 (S112), and ends the processing.

As described above, the information processing method is an information processing method performed by the STB 30 serving as an information processing apparatus which receives an operation performed on the display screen 25 by the remote control 10 including the enter button B1 and held in a user's hand. The information processing method includes: receiving, from the remote control 10, button-press information indicating that the enter button B1 has been pressed; displaying, on the display screen 25, one or more objects each of which is associated with an executable function and displaying, on the display screen 25, a pointer at a position designated by the remote control 10; and executing a function associated with a first object out of the one or more objects when the button-press information is received in the receiving during a period described below. Specifically, the period starts at a time point (t2) that is when a predetermined first period elapses from a first time point (t1) at which the pointer enters a region of the first object, and ends at a time point (t4) that is when a predetermined second period elapses from a second time point (t3) at which the pointer deviates from the region of the first object.

[1-5. Effects Etc.]

According to the information processing apparatus, the information processing method, and the information processing system in Embodiment 1, a user can effectively perform an operation (action) without being influenced by hand shake and the like. Hence, it is possible to reduce erroneous operations caused by hand shake. For example, when the user moves the pointer 101 to the region of the first object and presses the enter button B1, such a wasteful action (miss of the press of the enter button B1) can be reduced that the pointer 101 deviates from the region of the first object due to hand shake or the like and the function associated with the first object cannot be executed. Moreover, such another wasteful action is not caused that the pointer 101 deviates from the region of the first object by hand shake and enters the region of the second object that is different from the second object, and the function associated with the second object is executed.

In addition, beginner users and the like tend to avoid use of the pointing devices because it takes time for them to get used to the pointing devices. Since the above configuration reduces erroneous operations caused by hand shake, it takes less time for the beginner users to get used to the devices.

For example, the option function is switched on (the function associated with the object is activated) when a predetermined period (first period) elapses from the first time point (t1) at which the pointer 101 enters the region of the first object. The predetermined period is only a short period such as a few hundred milliseconds to a few seconds, and thus, it does not ruin the operational feeling of the beginner users and the like including older people. Hence, switching on the option function after a predetermined period (first period) from the first time point (t1) is a significant function of the executing unit.

As described above, in consideration with safety, such as preventing the function associated with another object from being executed, it may be that the function associated with the first object is executed only when the position of the pointer after the deviation caused by hand shake is within an appropriate distance from the first object.

It may also be that all of the information temporarily stored in the storage unit 34 is discarded also in the case where the screen of the display screen 25 changes due to an application executed by the STB 30, an internal timer of the operation system (OS) of the STB 30, or the like. Here, the case where the screen of the display screen 25 changes is, for example, the case where the screen regularly or irregularly changes when the screen saver is activated or due to various applications.

Embodiment 2

In Embodiment 1, the user do not clearly know the timing at which the function associated with the object is activated (enabled). In Embodiment 2, a description is given of an example where the timing at which the function is activated (enabled) is visually and clearly informed (presented) to the user. An information processing apparatus, an information processing method, and an information processing system according to Embodiment 2 is substantially the same as those in Embodiment 1. Hence, the following describes characteristic portions of Embodiment 2.

FIG. 13 to FIG. 18 illustrate examples of a method of visually informing the timing at which the function is activated (enabled).

Figure 13:
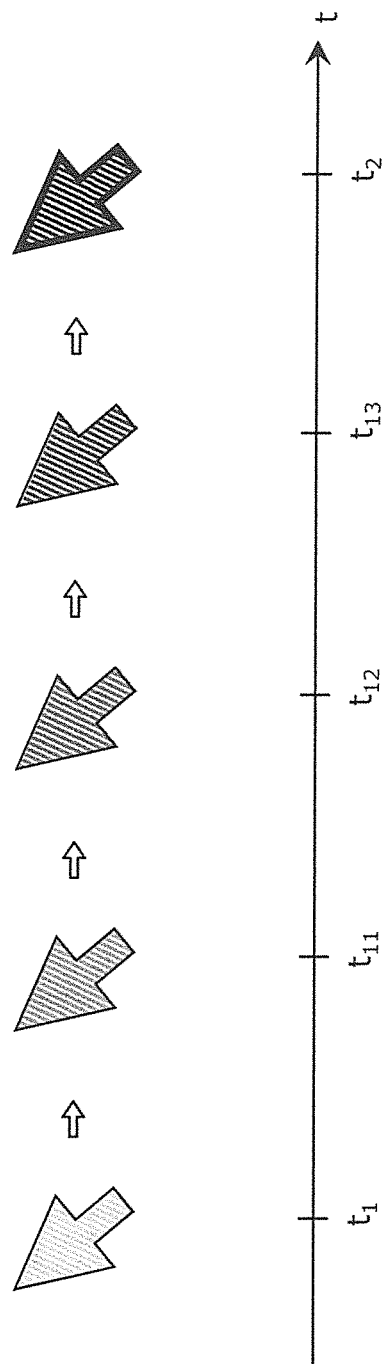
FIG. 13 illustrates an example of a method of visually informing the timing at which a function is activated (enabled) according to Embodiment 2.
Figure 14:
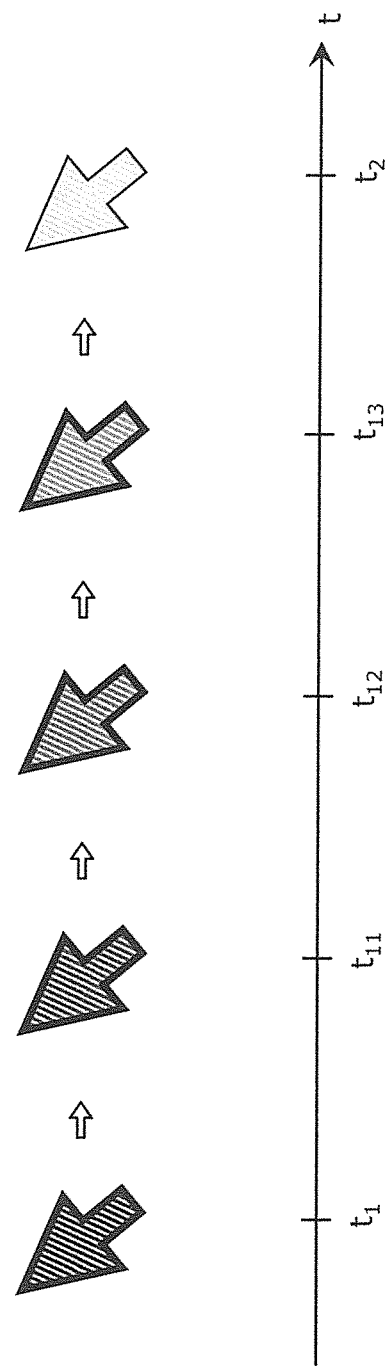
FIG. 14 illustrates another example of a method of visually informing the timing at which a function is activated (enabled) according to Embodiment 2.

For example, as FIG. 13 illustrates, it may be that the display control unit 32 turns the color of the pointer darker (color the pointer) over time (t11 to t13) from the first time point (t1) at which the pointer enters the region of the object to the time point (t2) that is when a first period elapses from the first time point (t1) and that is when the function is activated (enabled). Then, at the time point (t2) that is when the first period elapses, a change may be made to the frame of the pointer (for example, the frame is changed to thick-frame in FIG. 13). Of course, as FIG. 14 illustrates, the color of the pointer may be turned lighter over time (t11 to t13). Then, at the time point (t2) that is after the first period, a change may be made to the frame of the pointer (for example, the thick-frame is changed to the thin-frame in FIG. 14).

With this, it is possible to visually inform (present) the timing at which the function is activated (enabled) by coloring the pointer for a predetermined period, without requiring the user to intentionally restrict (immobilize etc.) the operation of the remote control 10 for the predetermined period. The predetermined period is a period from the first time point (t1) at which the pointer enters the region of the object, to the time point (t2) that is when the first period elapses from the first time point and that is when the function associated with the object is activated (enabled).

Figure 15:
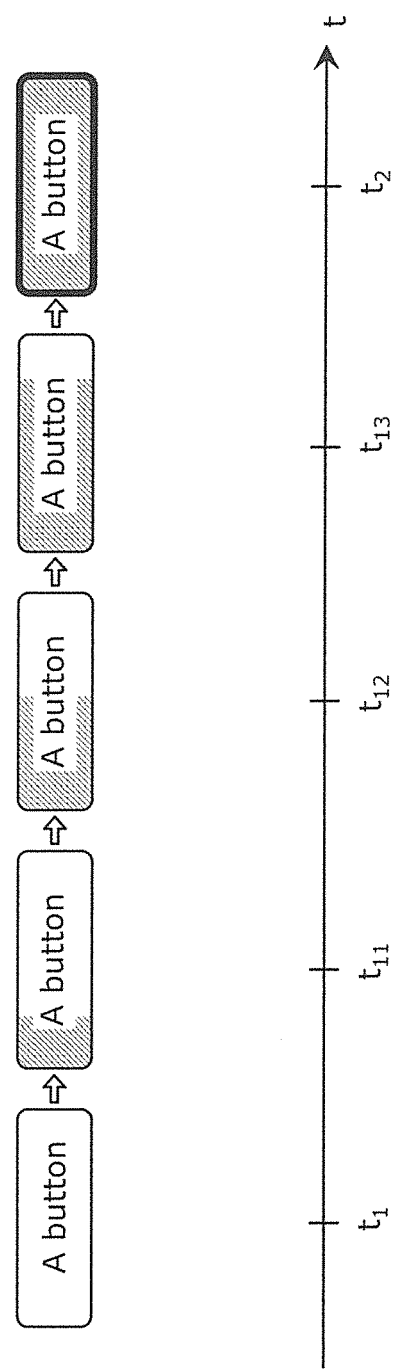
FIG. 15 illustrates another example of a method of visually informing the timing at which a function is activated (enabled) according to Embodiment 2.
Figure 16:
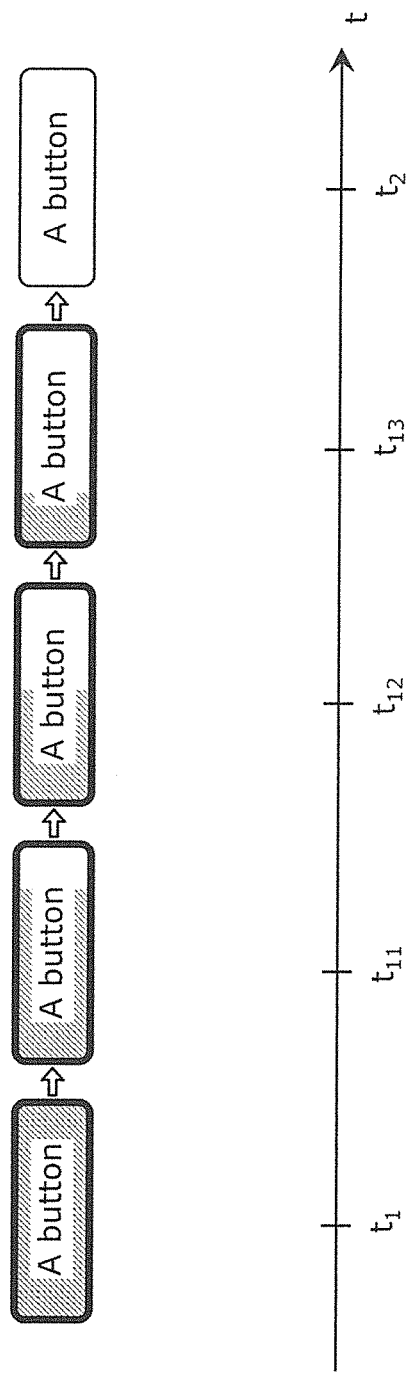
FIG. 16 illustrates another example of a method of visually informing the timing at which a function is activated (enabled) according to Embodiment 2.

As FIG. 15 illustrates, the display control unit 32 may turn the color of the object darker (color the object) over time (t11 to t13) during a period from the first time point (t1) at which the pointer enters the object, to the time point (t2) that is when the first period elapses from the first time point and that is when the function is activated (enabled). Then, at the time point (t2) that is after the first period, a change may be made to the frame of the object (for example, thick-frame in FIG. 15). Of course, as FIG. 16 illustrates, the color of the object may be turned lighter over time (t11 to t13). Then, at the time point (t2) that is after the first period, a change may be made to the frame of the object (for example, the thick-frame is changed to the thin-frame in FIG. 16).

Figure 17:
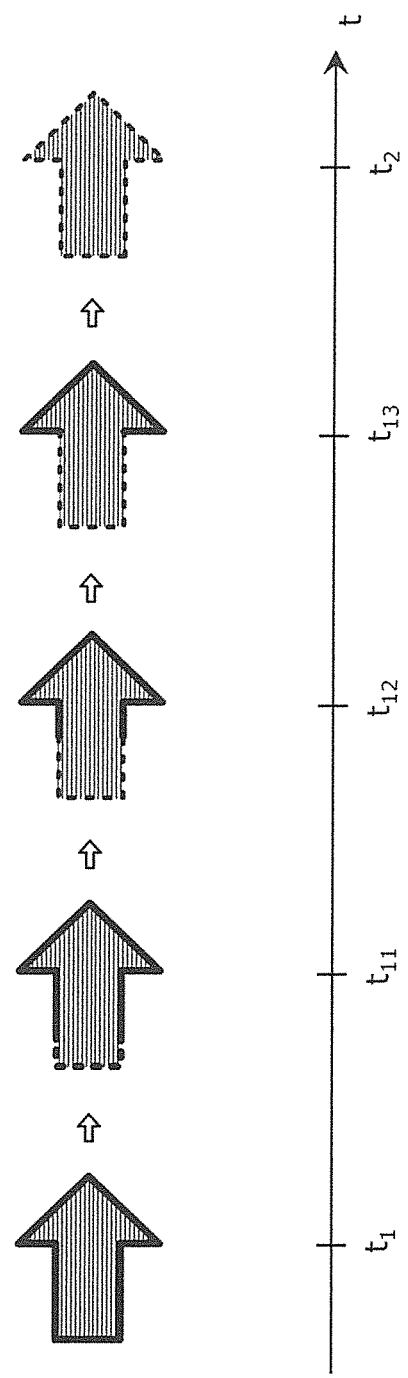
FIG. 17 illustrates another example of a method of visually informing the timing at which a function is activated (enabled) according to Embodiment 2.

For example, as FIG. 17 illustrates, it may also be that the display control unit 32 increases the change region of the frame color of the pointer (dotted portion of the thick-frame in FIG. 17) over time (t11 to t13) during a period from the first time point (t1) at which the pointer enters the region of the object, to the time point (t2) that is after a first period and that is when the function is activated (enabled). Then, at the time point (t2) that is after the first period, the color of the frame of the pointer may be completely changed (dotted frame in FIG. 17). In such a manner, the color of the frame of the pointer may be changed from the first time point (t1) to the time point (t2) that is after the first period.

Figure 18:
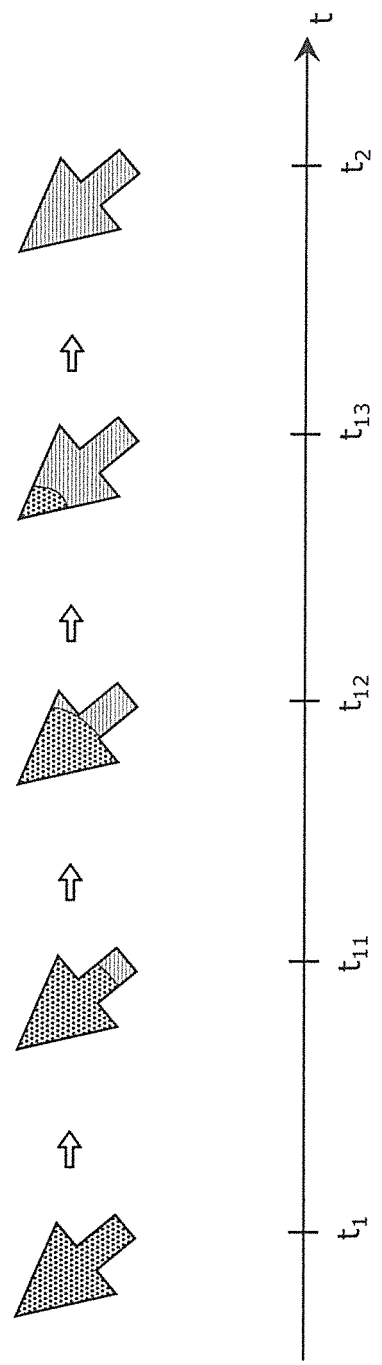
FIG. 18 illustrates another example of a method of visually informing the timing at which a function is activated (enabled) according to Embodiment 2.

Moreover, as FIG. 18 illustrates, it may be that the display control unit 32 increases the region of the pointer whose color is changed (region of the hatched line in FIG. 18) over time (t11 to t13) during a period from the first time point (t1) at which the pointer enters the region of the object to the time point (t2) that is after a first period and that is when the function is activated (enabled). At the time point (t2) that is after the first period, the color of the pointer may be completely changed (the region is changed into the hatched region in FIG. 18). In such a manner, the color of the pointer may be changed during a period from the first time point (t1) to the time point (t2) that is after the first period.

According to Embodiment 2, it is possible to visually inform (present) the timing at which the function is activated (enabled) without requiring the user to intentionally restrict (immobilize etc) the operation of the remote control 10 for a predetermined period. The predetermined period is from the first time point (t1) at which the pointer enters the region of the object to the time point (t2) that is after a first period and that is when the function associated with the object is activated (enabled). As a result, the user can visually recognize that the function has been activated, and then perform an operation, such as pressing the enter button B1. In this way, it is possible to increase the user's operability (user interface).

The display control unit 32 may change the color of the pointer or the object at the time (t2) that is after the first period, in addition to the case where the display control unit 32 changes the color of the pointer or the object over time (t11 to t13) during a period from the first time point (t1) to the time point (t2) that is after the first period. More specifically, the executing unit 33 (the function activating unit 332) may present that the function associated with the first object has been activated, by causing the display control unit 32 to change the color of the pointer or the first object at the time point (t2) that is when the first period elapses from the first time pint (t1).

A description has been given above of the example where the timing at which the function associated with the object is activated (enabled) is visually informed on the display screen 25, but the present invention is not limited to the example. For example, it may be that the timing at which the function is activated (enabled) is visually informed by an LED, a display tube, or the like included in the remote control 10 or the liquid crystal display 20.

A description has been given above of the example where the timing at which the function associated with the object is activated (enabled) is visually informed on the display screen 25, but the present invention is not limited to the example. It may be that the timing at which the function associated with the object is inactivated (disabled) is visually informed on the display screen 25.

In such a case, for example, the executing unit 33 (the function activating unit 332) may present that the function associated with the first object has been inactivated by the above described manners, such as causing the display control unit 32 to change the color of the pointer or the first object at the time point (t4) that is when the second period elapses from the second time point (t3).

Embodiment 3

In Embodiment 2, a description has been given of the example where the timing at which the function associated with an object is activated (enabled) is visually and clearly informed to the user, but the present invention is not limited to the example where the user is visually informed. It may be that the timing at which the function is activated (enabled) is informed auditorily to the user. A description is given of such an example in Embodiment 3.

Figure 19:
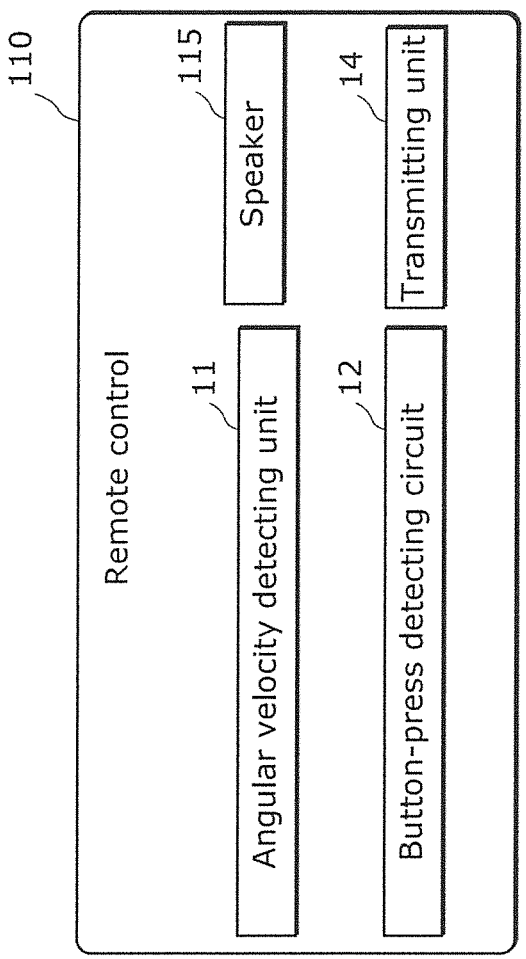
FIG. 19 is a block diagram illustrating an example of an internal configuration of a remote control according to Embodiment 3.
Figure 20:
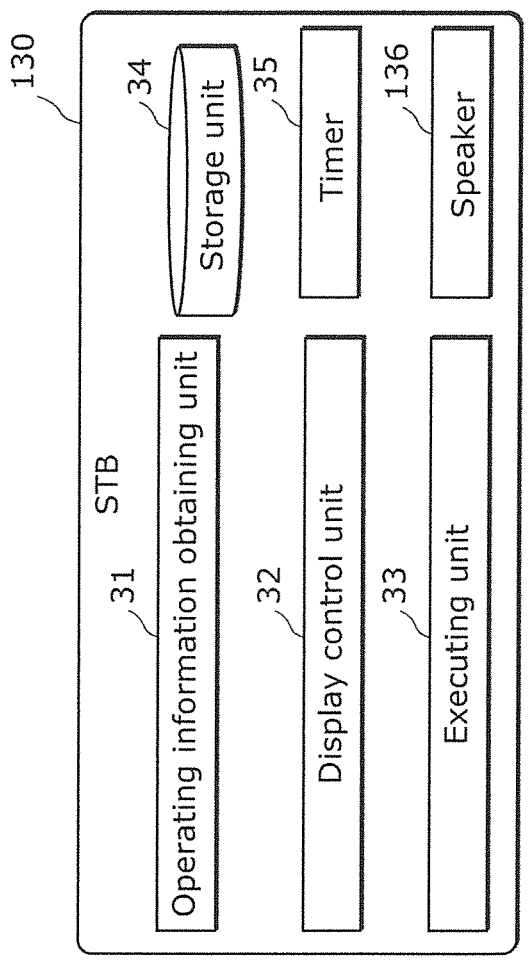
FIG. 20 is a block diagram illustrating an example of a configuration of an STB according to Embodiment 3.

FIG. 19 is a block diagram illustrating an example of an internal configuration of a remote control according to Embodiment 3. FIG. 20 is a block diagram illustrating an example of a configuration of an STB according to Embodiment 3. The same reference numbers are assigned to the structural components substantially the same as those in FIG. 2 and FIG. 3, and their detailed descriptions are not given.

A remote control 110 illustrated in FIG. 19 is different from the remote control 10 according to Embodiment 1 in that a speaker 115 is added. In a similar manner, the STB 130 illustrated in FIG. 20 is different from the STB 30 according to Embodiment 1 in that a speaker 136 is added.

With such a configuration, the executing unit 33 (the function activating unit 332) may present that the function associated with the first object has been activated, by causing the speaker 136 or the speaker 115 to output sound at the time point (t2) that is when the first period elapses from the first time point (t1).

The sound may be output from a speaker included in a liquid crystal display 20.

In such a manner, according to Embodiment 3, a speaker is included in at least one of the remote control 10, the STB 30 serving as an information processing apparatus, and the liquid crystal display 20 including the display screen 25. The function activating unit 332 can present that the function associated with the first object has been activated, by causing the speaker to output sound at the time point (t2) that is when the first period elapses from the first time point (t1).

Accordingly, it is possible to auditorily inform the timing at which the function has been activated (enabled) without requiring the user to intentionally restrict (immobilize etc) the operation of the remote control 110 for a predetermined period from the first time point (t1) to the time point (t2) that is after the first period. As a result, the user can auditorily recognize that the function has been activated, and then perform an operation, such as pressing the enter button B1. In this way, it is possible to increase the user's operability (user interface).

Embodiment 4

Descriptions have been given of the examples in Embodiments 2 and 3 where the timing at which the function associated with an object is activated (enabled) is visually or auditorily informed (presented) to the user, but the present invention is not limited to these examples. It may be that the timing at which the function is activated (enabled) is informed (presented) haptically to the user. A description is given of such an example in Embodiment 4.

Figure 21:
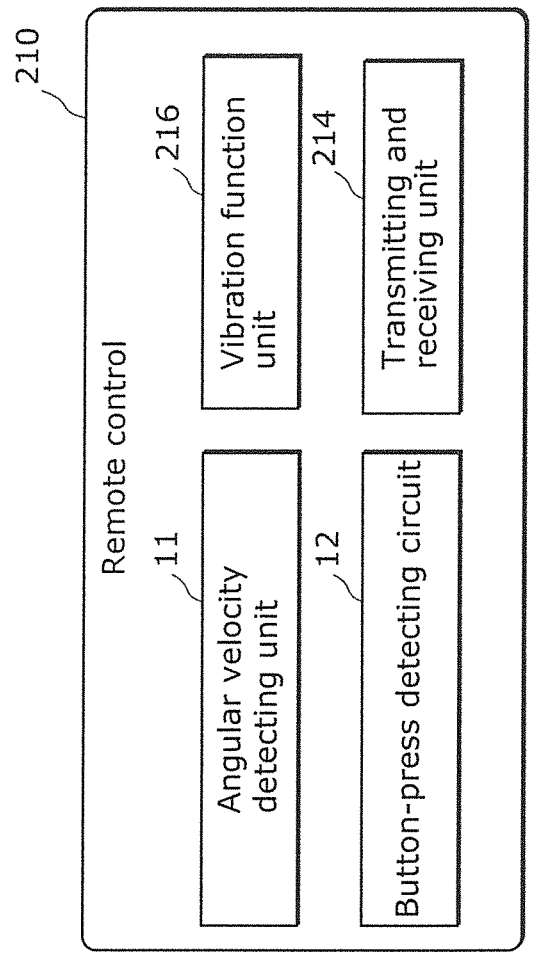
FIG. 21 is a block diagram illustrating an example of an internal configuration of a remote control according to Embodiment 4.

FIG. 21 is a block diagram illustrating an example of an internal configuration of a remote control according to Embodiment 4. FIG. 22 is a block diagram illustrating an example of a configuration of an STB according to Embodiment 4. The same reference numbers are assigned to the structural components substantially the same as those in FIG. 2 and FIG. 3, and their detailed descriptions are not given.

A remote control 210 illustrated in FIG. 21 is different from the remote control 10 according to Embodiment 1 in that a vibration function unit 216 and a transmitting and receiving unit 214 are added. In a similar manner, an STB 230 illustrated in FIG. 22 is different from the STB 30 according to Embodiment 1 in that a transmitting unit 237 is added.

The transmitting and receiving unit 214 includes functions of the transmitting unit 14, and further receives, from the STB 230, timing information about the timing at which the remote control 210 is to be vibrated.

The vibration function unit 216 includes a function for vibrating the remote control 210. The vibration function unit 216 vibrates the remote control 210 at the time point (t2) that is when a first period elapses from a first time point (t1), according to the timing information received by the transmitting and receiving unit 214.

The transmitting unit 237 informs the remote control 10 of the time point (t2) that is when the first period elapses from the first time point (t1).

With such a configuration, the executing unit 33 (the function activating unit 332) may present that the function associated with a first object has been activated, by causing the vibration function unit 216 to cause vibration at the time point (t2) that is when the first period elapses from the first time point (t1).

In such a manner, according to Embodiment 4, the remote control 210 further includes the vibration function unit that causes vibration. The function activating unit 332 can present that the function associated with the first object has been activated, by causing the vibration function unit 216 to vibrate the remote control 210 at the time point (t2) that is when the first period elapses from the first time point (t1).

Accordingly, it is possible to haptically inform the timing at which the function has been activated (enabled) without requiring the user to intentionally restrict (immobilize etc) the operation of the remote control 110 for a predetermined period from the first time point (t1) to the time point (t2) that is after the first period. As a result, the user can haptically recognize that the function has been activated, and then perform an operation, such as pressing the enter button B1. In this way, it is possible to increase the user's operability (user interface).

Other Embodiments

Although the information processing apparatus, the information processing method, and the information processing system according to the embodiments of the present invention have been described above, the present invention is not limited to these embodiments.

(1) In Embodiments 1 to 4, descriptions have been given of the examples where the information processing apparatus is an STB that can use ANDROID (registered trademark), but the present invention is not limited to the examples. The present invention may be applied to, for example, a game console, or an audio-visual (AV) equipment.

(2) In Embodiments 1 to 4, descriptions have been given of the examples where the pointing device is a remoter controller, but the present invention is not limited to the examples. The pointing device may be a device that allows a user to display a pointer at a predetermined position on the display screen 25 while the user holding the device in the user's hand, such as a mouse, trackball, or a joystick.

(3) Each structural component described above (the operating information obtaining unit 31, the display control unit 32, the executing unit 33, the storage unit 34, the timer 35, and the like) may be configured as a computer system that includes a microprocessor, a ROM, a RAM, a hard disk drive, a display unit, a keyboard, a mouse, and the like. The RAM or the hard disk drive stores a computer program. The microprocessor operates according to the computer program, whereby each structural component achieves its function. Here, the computer program is configured by combining a plurality of instruction codes issuing a command to a computer for achieving a predetermined function.

Moreover, part or all of the structural components constituting each of the units described above may be configured by a single system LSI (Large Scale Integration). The system LSI is a super-multifunctional LSI manufactured by integrating a plurality of structural parts on a single chip and, more specifically, is a computer system constituted by including a microprocessor, a ROM, a RAM and so on. The RAM stores a computer program. The microprocessor operates according to the computer program, whereby the system LSI achieves its function.

Furthermore, part or all of the structural components constituting each of the units described above may be configured by an IC card, which can be attached to and detached from each of the apparatuses and devices, or a stand-alone module. The IC card or the module is a computer system configured by a microprocessor, a ROM, a RAM and so on. The IC card or the module may include the ultra-multifunctional LSI mentioned above. The microprocessor operates according to the computer program, whereby the IC card or the module achieves its function. This IC card or module may have a tamper resistance.

The present invention may be the method described above. Also, the present invention may be a computer program that realizes the method by a computer or may be a digital signal made of such a computer program.

Further, the present invention may be achieved by recording the computer program or the digital signal mentioned above in a non-transitory computer-readable recording medium, for example, a flexible disk, a hard disk, a CD-ROM, an MO, a DVD, a DVD-ROM, a DVD-RAM, a BD (Blu-ray (registered trademark) Disc), a semiconductor memory or the like. Additionally, the present invention may be the above-noted digital signal that is recorded in such a non-transitory recording medium.

Moreover, the present invention may transmit the computer program or the digital signal mentioned above via a telecommunication line, a wireless or wired communication line, a network represented by the Internet, a data broadcasting or the like.

Also, the present invention may be a computer system including a microprocessor and a memory, the above-noted memory may store the computer program mentioned above, and the above-noted microprocessor may operate according to the computer program mentioned above.

Further, by recording the program or the digital signal mentioned above in the above-noted non-transitory recording medium and transferring it or by transferring the program or the digital signal mentioned above via the above-noted network or the like, the present invention may be implemented with another independent computer system.

Moreover, the above-described embodiments and the above-described variations may be combined individually.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention can be used for an information processing apparatus, an information processing method, and an information processing system. The present invention can be particularly used for an information processing apparatus, an information processing method, an information processing system and the like which receive an operation performed on the display screen by a remote control, a mouse, a pointing device such as a track ball or a joystick held by a user's hand.

The invention claimed is:

1. An information processing apparatus which receives an operation performed on a display screen by a pointing device including an enter button, the information processing apparatus comprising:
an operating information obtaining unit configured to receive, from the pointing device, button-press information indicating that the enter button has been pressed;
a display control unit configured to display one or more objects and a pointer on the display screen, the one or more objects each being associated with an executable function, the pointer being displayed at a position designated by the pointing device; and
an executing unit configured to execute a function associated with a first object out of the one or more objects when the operating information obtaining unit receives the button-press information during a period (i) starting when a predetermined first period elapses from a first time point at which the pointer enters a region of the first object and (ii) ending when a predetermined second period elapses from a second time point at which the pointer deviates from the region of the first object.

2. The information processing apparatus according to claim 1,
wherein the executing unit is further configured to execute the function associated with the first object when the operating information obtaining unit receives the button-press information during the period and the pointer is within a predetermined distance from a boundary of the region of the first object.

3. The information processing apparatus according to claim 1,
wherein the pointing device further includes an angular velocity detecting unit configured to detect angular velocity,
the operating information obtaining unit is configured to receive, from the pointing device, the button-press information and angular velocity information indicating the angular velocity, and
the display control unit is configured to display the one or more objects and the pointer on the display screen, the pointer being displayed at a position determined according to the angular velocity information as the position designated by the pointing device.

4. The information processing apparatus according to claim 1, further comprising:
a holding unit configured to hold the first time point and the second time point; and
a timer which counts the predetermined first period from the first time point, and the predetermined second period from the second time point.

5. The information processing apparatus according to claim 1,
wherein the executing unit includes:
a position obtaining unit configured to obtain a position of a region including each of the one or more objects on the display screen and a position of the pointer on the display screen; and
a function activating unit configured to activate the function associated with the first object when the predetermined first period elapses from the first time point.

6. The information processing apparatus according to claim 5,
wherein the function activating unit is further configured to present that the function associated with the first object has been activated, by causing the display control unit to change a color of the pointer when the predetermined first period elapses from the first time point.

7. The information processing apparatus according to claim 6,
wherein the function activating unit is configured to cause the display control unit to change the color of the pointer over time during the predetermined first period from the first time point.

8. The information processing apparatus according to claim 5,
wherein the function activating unit is further configured to present that the function associated with the first object has been activated, by causing the display control unit to change a color of the first object when the predetermined first period elapses from the first time point.

9. The information processing apparatus according to claim 8,
wherein the function activating unit is configured to cause the display control unit to change the color of the first object over time during the predetermined first period from the first time point.

10. The information processing apparatus according to claim 5,
wherein at least one of (i) the pointing device, (ii) the information processing apparatus, and (iii) a display apparatus including the display screen includes a speaker, and
the function activating unit is further configured to present that the function associated with the first object has been activated, by causing the speaker to output sound when the predetermined first period elapses from the first time point.

11. The information processing apparatus according to claim 5,
wherein the pointing device further includes a vibrating function unit which causes vibration, and
the function activating unit is further configured to present that the function associated with the first object has been activated, by causing the vibrating function unit to cause vibration when the predetermined first period elapses from the first time point.

12. An information processing method performed by an information processing apparatus which receives an operation performed on a display screen by a pointing device including an enter button, the information processing method comprising:
receiving, from the pointing device, button-press information indicating that the enter button has been pressed;
displaying one or more objects and a pointer on the display screen, the one or more objects each being associated with an executable function, the pointer being displayed at a position designated by the pointing device; and
executing a function associated with a first object out of the one or more objects when the button-press information is received in the receiving during a period, (i) starting when a predetermined first period elapses from a first time point at which the pointer enters a region of the first object and (ii) ending when a predetermined second period elapses from a second time point at which the pointer deviates from the region of the first object.

13. A system comprising:

a pointing device including an enter button; and an information processing apparatus which receives an operation performed on a display screen by the pointing device, wherein the information processing apparatus includes:

an operating information obtaining unit configured to receive, from the pointing device, button-press information indicating that the enter button has been pressed;

a display control unit configured to display one or more objects and a pointer on the display screen, the one or more objects each being associated with an executable function, the pointer being displayed at a position designated by the pointing device; and an executing unit configured to execute a function associated with a first object out of the one or more objects when the operating information obtaining unit receives the button-press information during a period (i) starting when a predetermined first period elapses from a first time point at which the pointer enters a region of the first object and (ii) ending when a predetermined second period elapses from a second time point at which the pointer deviates from the region of the first object.

* * * * *